US009596200B1

United States Patent
Chen et al.

(10) Patent No.: US 9,596,200 B1
(45) Date of Patent: *Mar. 14, 2017

(54) LINKING SELECTED MESSAGES IN ELECTRONIC MESSAGE THREADS

(71) Applicant: International Business Machines Corporation, Armonk, NY (US)

(72) Inventors: Xiang Chen, Beijing (CN); Bin Gu, Beijing (CN); Cheng Fang Wang, Beijing (CN); Wumi Zhong, Beijing (CN); Jia Zou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/185,759

(22) Filed: Jun. 17, 2016

Related U.S. Application Data (63) Continuation of application No. 14/977,850, filed on Dec. 22, 2015, now Pat. No. 9,438,542, which is a
(Continued)

(51) Int. Cl.
*H04L 12/58* (2006.01)
*G06F 3/0481* (2013.01)
*G06F 3/0484* (2013.01)

(52) U.S. Cl.
CPC .............. *H04L 51/04* (2013.01); *H04L 51/16* (2013.01); *G06F 3/04817* (2013.01); *G06F 3/04842* (2013.01)

(58) Field of Classification Search
CPC .......... H04L 51/00–51/38; H04L 51/04; H04L 51/16; G06F 3/04817; G06F 3/04842
See application file for complete search history.

(56) References Cited

U.S. PATENT DOCUMENTS 6,697,365 B1  2/2004  Messenger
7,039,677 B2  5/2006  Fitzpatrick et al.
(Continued)

FOREIGN PATENT DOCUMENTS

CN  103490989 A  1/2014
EP   2581864 A2  4/2013
(Continued)

OTHER PUBLICATIONS

Fono, D., et al., Structuring and supporting persistent chat conversations, Proceedings of the 2006 20th anniversary conference on Computer supported cooperative work, 2006, pp. 455-458, [retrieved on Sep. 22, 2016], Retrieved from the Internet: <URL:http://dl.acm.org/>.*

(Continued)

*Primary Examiner* — Geoffrey St Leger
(74) *Attorney, Agent, or Firm* — Brian M. Restauro (57) ABSTRACT

Embodiments of the present invention provide methods, computer program products, and systems for linking selected messages in electronic message threads. In one embodiment, related messages are identified and graphic elements associated with a first message are displayed on a user interface. Responsive to receiving a user interaction with the graphical element, a second message can be viewed, where the second message either responds to the first message or is responded to by the first message. Displaying graphical elements associated with related messages can eliminate potential confusion between users in group messages.

1 Claim, 7 Drawing Sheets

Related U.S. Application Data continuation of application No. 14/865,035, filed on Sep. 25, 2015.

(56) References Cited

U.S. PATENT DOCUMENTS

| | | | |
|---|---|---|---|
| 7,159,011 B1 | 1/2007 | Knight et al. | |
| 7,552,188 B2 | 6/2009 | Kato et al. | |
| 7,571,213 B2 | 8/2009 | Walkush et al. | |
| 7,725,538 B2 | 5/2010 | Kirkland et al. | |
| 7,765,265 B1* | 7/2010 | Granito | G06Q 10/107 707/999.003 |
| 8,108,464 B1 | 1/2012 | Rochelle et al. | |
| 8,166,408 B2 | 4/2012 | Castellucci | |
| 8,190,999 B2 | 5/2012 | Chen et al. | |
| 8,255,462 B2 | 8/2012 | Kondo | |
| 8,335,827 B2 | 12/2012 | Mishchenko | |
| 8,386,576 B2 | 2/2013 | Anderson | |
| 8,621,022 B2 | 12/2013 | Buchheit et al. | |
| 8,665,311 B2 | 3/2014 | Herz et al. | |
| 8,683,351 B2 | 3/2014 | Cheng et al. | |
| 8,812,599 B2 | 8/2014 | Fuhrmann | |
| 8,903,928 B2 | 12/2014 | Staats | |
| 9,438,542 B1 | 9/2016 | Chen et al. | |
| 2005/0166154 A1 | 7/2005 | Wilson et al. | |
| 2006/0031361 A1 | 2/2006 | Bailey et al. | |
| 2008/0147804 A1* | 6/2008 | Gyure | H04L 51/18 709/206 |
| 2008/0189623 A1* | 8/2008 | Patil | H04L 12/1827 715/753 |
| 2009/0210800 A1* | 8/2009 | Mccann | H04L 51/16 715/752 |
| 2012/0246251 A1 | 9/2012 | Staats | |
| 2012/0290950 A1 | 11/2012 | Rapaport et al. | |
| 2014/0143684 A1 | 5/2014 | Oh et al. | |
| 2014/0201292 A1 | 7/2014 | Savage et al. | |
| 2014/0330913 A1* | 11/2014 | Pascal | H04L 51/16 709/206 |
| 2014/0379818 A1* | 12/2014 | Cudak | H04L 51/16 709/206 |
| 2015/0067075 A1 | 3/2015 | Sheppard et al. | |
| 2015/0074555 A1* | 3/2015 | Yoon | G06F 3/04817 715/753 |
| 2015/0095801 A1* | 4/2015 | Kim | H04L 51/04 715/752 |
| 2015/0177974 A1* | 6/2015 | Lu | G06F 3/04847 715/752 |
| 2015/0180808 A1* | 6/2015 | Moisa | G06T 11/001 709/206 |
| 2015/0186012 A1* | 7/2015 | Coleman | G06F 3/04842 715/752 |
| 2015/0188862 A1 | 7/2015 | Ghafourifar et al. | |
| 2015/0195221 A1* | 7/2015 | Rasmussen | H04L 51/04 715/753 |
| 2015/0244657 A1 | 8/2015 | Ghafourifar et al. | |
| 2015/0281155 A1 | 10/2015 | Cue et al. | |
| 2015/0295873 A1 | 10/2015 | Orr | |
| 2015/0312182 A1* | 10/2015 | Langholz | H04L 51/04 715/753 |
| 2015/0339373 A1 | 11/2015 | Carlson et al. | |
| 2016/0065520 A1 | 3/2016 | Puranik et al. | |
| 2016/0072755 A1 | 3/2016 | Su et al. | |
| 2016/0112358 A1 | 4/2016 | Ghafourifar et al. | |

FOREIGN PATENT DOCUMENTS

| | | |
|---|---|---|
| WO | 02093414 A1 | 11/2002 |
| WO | 2010093678 A1 | 8/2010 |

OTHER PUBLICATIONS

Method of Managing Open Chat Conversations with Context, IP.com No. IPCOM000199378D, Aug. 31, 2010, 4 pages, [retrieved on Sep. 22, 2016], Retrieved from the Internet: <URL:https://iq.ip.com/discover>.*

Adams, P., et al., Conversational Thread Extraction and Topic Detection in Text-Based Chat, Semantic Computing, 2010, pp. 87-113, [retrieved on Sep. 22, 2016], Retrieved from the Internet: <URL:http://ieeexplore.ieee.org/>.*

Castro-Hernandez et al.; "Effects of cohesion-based feedback on the collaborations in global software development teams"; 2014 ICST; [retrieved on May 8, 2016]; Retrieved from Internet URL; <http://ieeexplore.ieee.org/stamp/stamp.jsp?tp=&arnumber=7014552>; pp. 74-83.

Fono; "Structuring and Supporting Persistent Chat Conversations"; 2006 ACM; [retrieved on May 8, 2016]; Retrieved from Internet URL; <http://dl.acm.org/citation.cfm?id=1180944>; pp. 455-458.

McCarthy et al.; "Digital Backchannels in Shared Physical Spaces: Attention, Intention and Contention"; 2004 ACM; [retrieved on May 8, 2016]; Retrieved from Internet URL; <http://dl.acm.org/citation.cfm?id=1031700>; pp. 550-553.

Schroeter et al.; "A Synchronous Multimedia Annotation System for Secure Collaboratories"; 2006 IEEE; [retrieved on May 8, 2016]; Retrieved from Internet URL; <http://ieeexplore.ieee.org/stamp/stamp/jsp?tp=&arnumber=4031014>; pp. 1-8.

Shen, Haifeng, "Integrating Topic-centric Thread-based Organized Chat into Web-based Enterprise Instant Messengers", IEEE International Conference on E-Business Engineering, IEEE Computer Society, © 2010 IEEE, pp. 442-447, DOI 10.1109/ICEBE.2010.37.

Smith et al., "Conversation Trees and Threaded Chats", CSCW'00, Dec. 2-6, 2000, Philadelphia, PA., Copyright 2000 ACM 1-58113-222-0/00/0012, pp. 97-105.

"A method to classify talking topics from multiple topics in a group chat", An IP.com Prior Art Database Technical Disclosure, Authors et. al.: Disclosed Anonymously, IP.com No. 000238917, IP.com Electronic Publication: Sep. 25, 2014, pp. 1-7.

"Method and System for Filtering Chat Messages based on Topic", An IP.com Prior Art Database Technical Disclosure, Authors et. al.: Disclosed Anonymously, IP.com No. 000208083, IP.com Electronic Publication: Jun. 22, 2011, pp. 1-2.

Chen et al.; U.S. Appl. No. 14/865,035, filed Sep. 25, 2015; Entitled "Linking Selected Messages in Electronic Message Threads".

List of IBM Patents or Patent Applications Treated As Related; dated Sep. 14, 2016; 2 pages.

* cited by examiner

LINKING SELECTED MESSAGES IN ELECTRONIC MESSAGE THREADS

BACKGROUND OF THE INVENTION

The present invention relates generally to the field of electronic messages, and more particularly to grouping electronic messages.

Typically, individuals can engage in multi-party message conversations using electronic message services, such as text messages. When responding to an electronic message, users of electronic message services can select a few options to select whom they send the message to. For example, users involved with a group message can typically select a "Reply" option, which enables a user to respond to all participants of the group message. Generally, user messages sent in reply to a group message (e.g., a group chat) are displayed to their recipients in order of receipt.

SUMMARY

Embodiments of the present invention provide methods, program products, and systems for linking selected messages in electronic message threads. In one embodiment of the present invention, a method is provided comprising: identifying a set of related messages, wherein the set of related messages includes at least a first message and a second message related to the first message; displaying in a user interface displaying the first message, a graphical element associated with the first message; and responsive to receiving a user interaction with a visual indication, displaying the second message; wherein the second message is one of the following: a message that responds to the first message or a message that the first message responds to.

DETAILED DESCRIPTION

Embodiments of the present invention recognize that in multi-party message conversations, messages and responses to those messages can be misinterpreted by users. In some instances, multiple questions from different users may be asked and a response to any one of those questions may be misinterpreted as a response for the other questions. For example, a group message between three users (alpha, beta, gamma) can have two questions A and B from user alpha and beta respectively. A response by user gamma could be misinterpreted as a response to either question A or B. Typically, to distinguish between responses, a user (e.g., user gamma) would have to manually identify and provide enough textual detail for other users (e.g., alpha and beta) to discern which question is being answered. Embodiments of the present invention provide solutions to eliminate potential confusion between users in group messages. In this manner, as discussed in greater detail in this specification, embodiments of the present invention can be used to continue message conversations without having to manually identify which responses correspond to each other.

Figure 1:
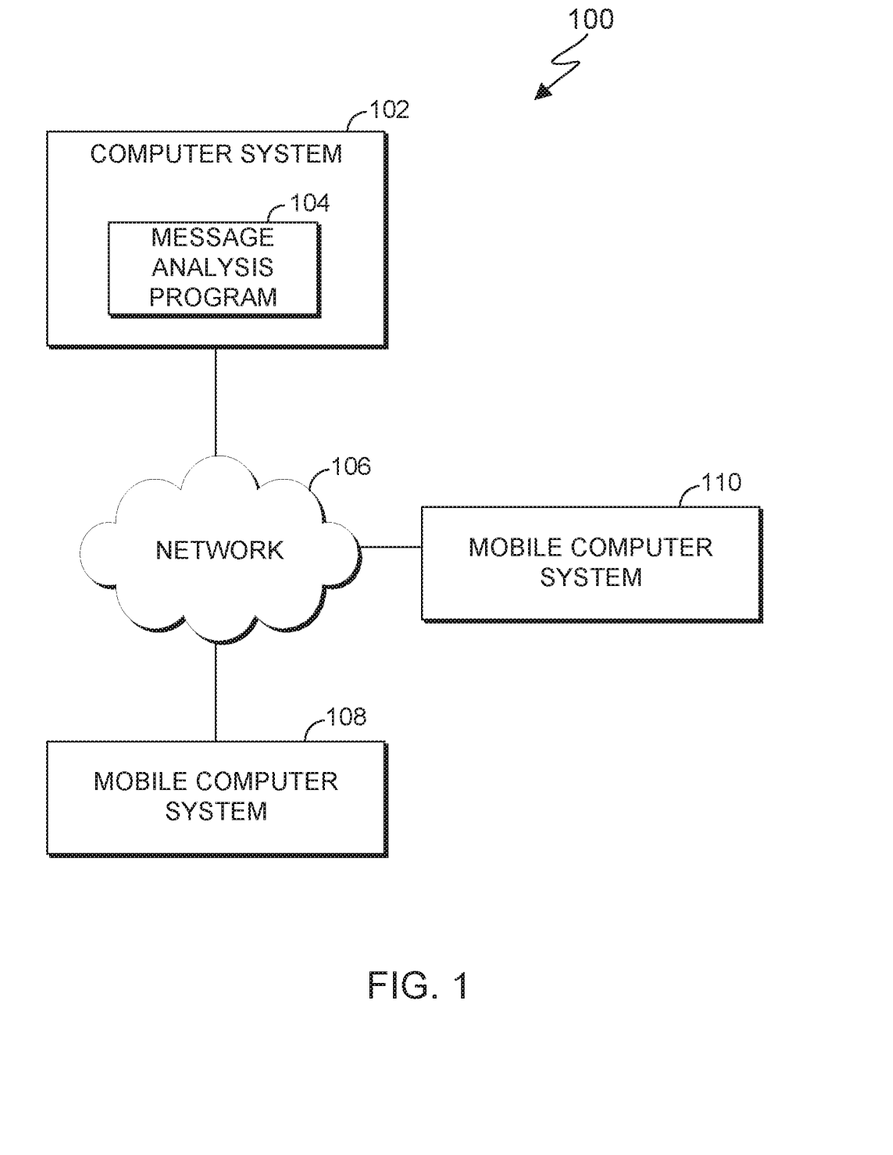
FIG. 1 is a block diagram of a computing environment, in accordance with an embodiment of the present invention.

FIG. 1 is a functional block diagram of computing environment 100, in accordance with an embodiment of the present invention. Computing environment 100 includes computer system 102, mobile computer system 110, and mobile computer system 108. Computer system 102, mobile computer system 110, and mobile computer system 108 can be desktop computers, laptop computers, specialized computer servers, mobile devices, or any other computer systems known in the art. In certain embodiments, computer system 102, mobile computer system 110, and mobile computer system 108 represent computer systems utilizing clustered computers and components to act as a single pool of seamless resources when accessed through network 106. For example, such embodiments may be used in data center, cloud computing, storage area network (SAN), and network attached storage (NAS) applications. In certain embodiments, computer system 102, mobile computer system 110, and mobile computer system 108 represent virtual machines. In general, computer system 102, mobile computer system 110, and mobile computer system 108 are representative of any electronic devices, or combination of electronic devices, capable of executing machine-readable program instructions, as described in greater detail with regard to FIG. 6.

Computer system 102 includes message analysis program 104. Message analysis program 104 communicates with mobile computer system 108 and mobile computer system 110 to receive messages from mobile computer systems 108 and 110 to create a visual indication of linked messages for user interfaces (not shown) of mobile computer systems 108 and 110 based, at least in part, on content of the messages as well as the relationship each message has to previous messages, as discussed in greater detail with regard to FIGS. 2-3. In other embodiments, message analysis program 104 can be stored locally on mobile computer systems 108 and 110.

In this embodiment, a relationship between a selected message and a subsequent message can be a parent/child relationship (e.g., a selected message, and a response to the selected message). Multiple messages sent to more than one individual can be designated as having a sibling relationship (e.g., two or more messages sent in parallel to multiple recipients). For example, one person may send a message asking a question to three other people. The messages generated in response to the question can be identified as siblings.

In this embodiment, each message is associated with metadata that can be used to classify and identify each respective message. For example, each message is associated with a respective message ID that distinguishes that message from another. The message ID can also indicate the author of the message. Each message is also associated with a corresponding timestamp that indicates when the message was transmitted. In this embodiment, message analysis program 104 can identify relationships between messages and use those relationships to create visual indications of those relationships which can eliminate confusion between responses to messages.

For example, in a group message between four individuals alpha, beta, gamma, and delta, individuals alpha, beta, and gamma can send messages $M_{1-3}$. Messages $M_{1-3}$ each ask a different question addressed to individual delta. Individual delta responds to questions posed in messages $M_{1-3}$ by generating messages $M_{4-6}$ containing the following content: "yes", "no", and "yes", respectively. Message analysis program 104 can identify parent/child relationships exist between messages $M_1$ and $M_4$, between messages $M_2$ and $M_5$, and between messages $M_3$ and $M_6$.

Message analysis program 104 can use the identified parent/child relationships to create graphical elements for a user interface displaying messages. The term "graphical element" as used herein, refers to a visual indication displayable by the user interface that denotes relationships between messages (e.g., a parent/child relationship) and/or identifies participants of those messages. Generally speaking, graphical elements are capable of being interacted with by users of the user interface. For example, responsive to a user interaction with a graphical element associated with a first message, message analysis program 104 can display a visual indication that corresponds to a second message that responds to the first message, as described later in this specification.

In this embodiment, a graphical element can be one or more symbols (e.g., arrows) for each respective message displayed in the user interface. For example, a "down arrow" at the end of a message denotes a parent message while an "up arrow" denotes a child message. In other embodiments, message analysis program 104 can use any number of combination of symbols and/or characters to denote parent and child relationships.

In another embodiment, a graphical element may be a visual indication other than a combination of symbols and/or characters. For example, a graphical element can be a visual indication that includes highlighting related messages (e.g., parent/child relationship), where the related messages themselves are capable of being interacted with by users of the user interface. In another embodiment, a graphical element may also serve as a visual indication that is displayed in response to receiving a user interaction with a different graphical element. Continuing the above example, a user may select graphical element A (e.g., clicking on graphical element A on a computer screen) associated with a first message and the resulting visual indication is a highlighted graphical element (e.g., graphical element B) associated with a second message, where the second message responds to the first message.

In other embodiments, message analysis program 104 can create a visual indication by moving identified responses (e.g., child message) in a position directly beneath parent messages. For example, in a group message between four individuals alpha, beta, gamma, and delta, individuals alpha, beta, and gamma can send messages $M_{1-3}$. Messages $M_{1-3}$ each ask a different question addressed to individual delta. Individual delta responds to questions posed in messages $M_{1-3}$ by generating messages $M_{4-6}$ containing the following content: "yes", "no", and "yes", respectively. Message analysis program 104 can identify parent/child relationships exist between messages $M_1$ and $M_4$, between messages $M_2$ and $M_5$, and between messages $M_3$ and $M_6$. Message analysis program 104 can then create a visual indication by moving message $M_4$ directly beneath message $M_1$, moving message $M_5$ beneath message $M_2$, and moving message $M_6$ beneath message $M_3$.

In this embodiment, a user interface displaying messages can have icons associated with users followed by content of a sent message of the user. For example, a group message (e.g., a group text) between three users, alpha, beta, and gamma can have the following user interface display for a user device (e.g., mobile phone) that has three messages $M_{1-3}$: the icon of user alpha followed by the content of message $M_1$; the icon of user beta followed by the content of message $M_2$ generated in response to message $M_1$; and the icon of user gamma followed by the content of message $M_3$, also generated in response to message $M_1$. In general, the user interface displaying messages sent by one or more users can be implemented with any combination of one or more message interface applications.

Continuing the above example, message analysis program 104 can create a graphical element for the user interface by adding a "down arrow" to the end of the content of message $M_1$ to denote that message $M_1$ is a parent message. For messages $M_2$ and $M_3$, message analysis program 104 can add "up arrows" to each respective message to indicate a child relationship to message $M_1$.

Message analysis program 104 can display a visual indication to show the identified relationships (e.g., subsequent messages generated in response to a message or messages that are being responded to). In this embodiment, message analysis program 104 can, responsive to a user selecting a graphical element (e.g., an up or down arrow) display one or more icons of users next to the added arrow (e.g., to show a message that responds to an earlier message) that enlarge when a message is selected to identify participants that have responded to the selected message, as discussed in greater detail, with regard to FIGS. 5A and 5B. Continuing the above example, message $M_1$ includes a "down arrow" that denotes that it is a parent message. Message analysis program 104 can include a visual indication that, responsive to a user selecting message $M_1$, enlarges the icons associated with users that have responded to message $M_1$. For example, responsive to selecting message $M_1$, message analysis program 104 can display enlarged icons associated with users beta and gamma to show that users beta and gamma have responded to message $M_1$. Conversely, message analysis program 104 can, responsive to selecting a "child message", display an enlarged icon of the user who generated the "parent message". For example, responsive to selecting message $M_2$, the icon for user alpha (i.e., the person who generated message $M_1$ which has been identified as the parent message) is enlarged and displayed.

Mobile computer systems 108 and 110 communicate with message analysis program 104 via network 106 to receive graphical elements indicating linked messages from an originating message device to a receiving message device. In this embodiment, mobile computer system 108 and 110 are cellular devices (i.e. mobile phones). In general, mobile computer system 108 and 110 can be implemented with any device capable of sending and receiving messages.

The term "messages", as used herein, refers to any electronic communication medium known in the art. For example, a message can be a text message, e-mail, multimedia message service (MMS) message, etc. The phrase, "originating message device", as used herein, refers to a communication device (e.g., mobile computer system 108) that is used, for illustrative purposes, as a device that initiates a message. The phrase, "receiving message device", as used herein, refers to a communication device (e.g., mobile computer system 110) that is used as the device that receives a message. For illustrative purposes, this embodiment may be discussed with respect to mobile computer system 108 serving as the originating message device and mobile computer system 110 serving as the receiving message device. It should be understood that either mobile computer system can serve as the originating message device while the other serves as the receiving message device.

Network 106 can be, for example, a local area network (LAN), a wide area network (WAN) such as the Internet, or a combination of the two, and include wired, wireless, or fiber optic connections. In general, network 106 can be any combination of connections and protocols that will support communications between computer system 102, mobile computer system 108, and mobile computer system 110, in accordance with a desired embodiment of the invention.

Figure 2:
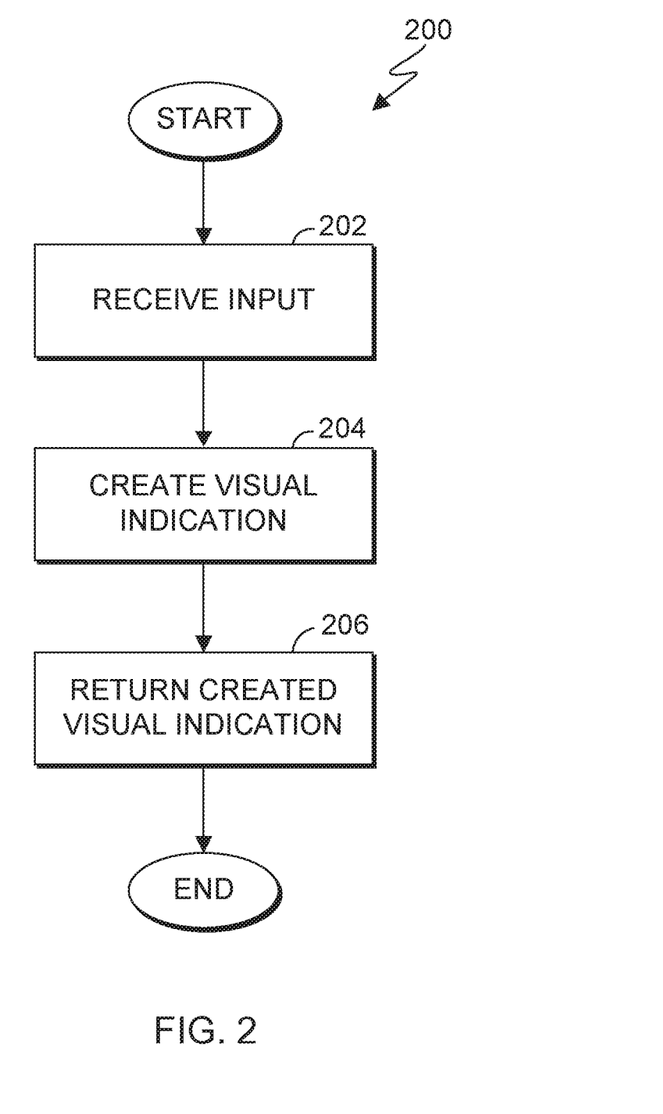
FIG. 2 is a flowchart illustrating operational steps of linking messages in electronic message threads, in accordance with an embodiment of the present invention.

FIG. 2 is a flowchart 200 illustrating operational steps of linking messages in electronic message threads, in accordance with an embodiment of the present invention.

In step 202, message analysis program 104 receives input from mobile computer system 108. In this embodiment, an input may be an original message (i.e., a parent message) or a response to an original message (i.e., a child message). In this embodiment, a user may specify that the input is an original message or a response to an original message. For example, a user may specify that the input responds to a particular message. Responsive to receiving the input from the user, message analysis program 104 can then identify parent/child relationships between messages. In other embodiments, message analysis program 104 can receive inputs from one or more components of computing environment 100.

In another embodiment, message analysis program 104 can identify an original message (i.e., a parent message) or a response to an original message (i.e., a child message) using natural language processing. In other words, message analysis program 104 can identify relationships between messages using natural language processing. For example, message analysis program 104 can use natural language annotations (e.g., sentence splitting, tokenization, POS tagging, chunking, dependency parsing, and anaphora resolution, etc.) to process the semantics of the text.

In step 204, message analysis program 104 creates a graphical element for a user interface that displays messages for mobile computer system 108. In this embodiment, message analysis program 104 creates a graphical element for the user interface displaying messages by adding arrows to indicate message relatedness, linking related messages, and listing icons of users associated with the linked messages, as discussed in greater detail with regard to FIG. 3.

In step 206, message analysis program 104 returns the graphical element for the user interface that displays messages to mobile computer system 108 and 110. In this embodiment, message analysis program 104 returns the graphical element by transmitting the graphical element to mobile computer systems 108 and 110 via network 106.

Figure 3:
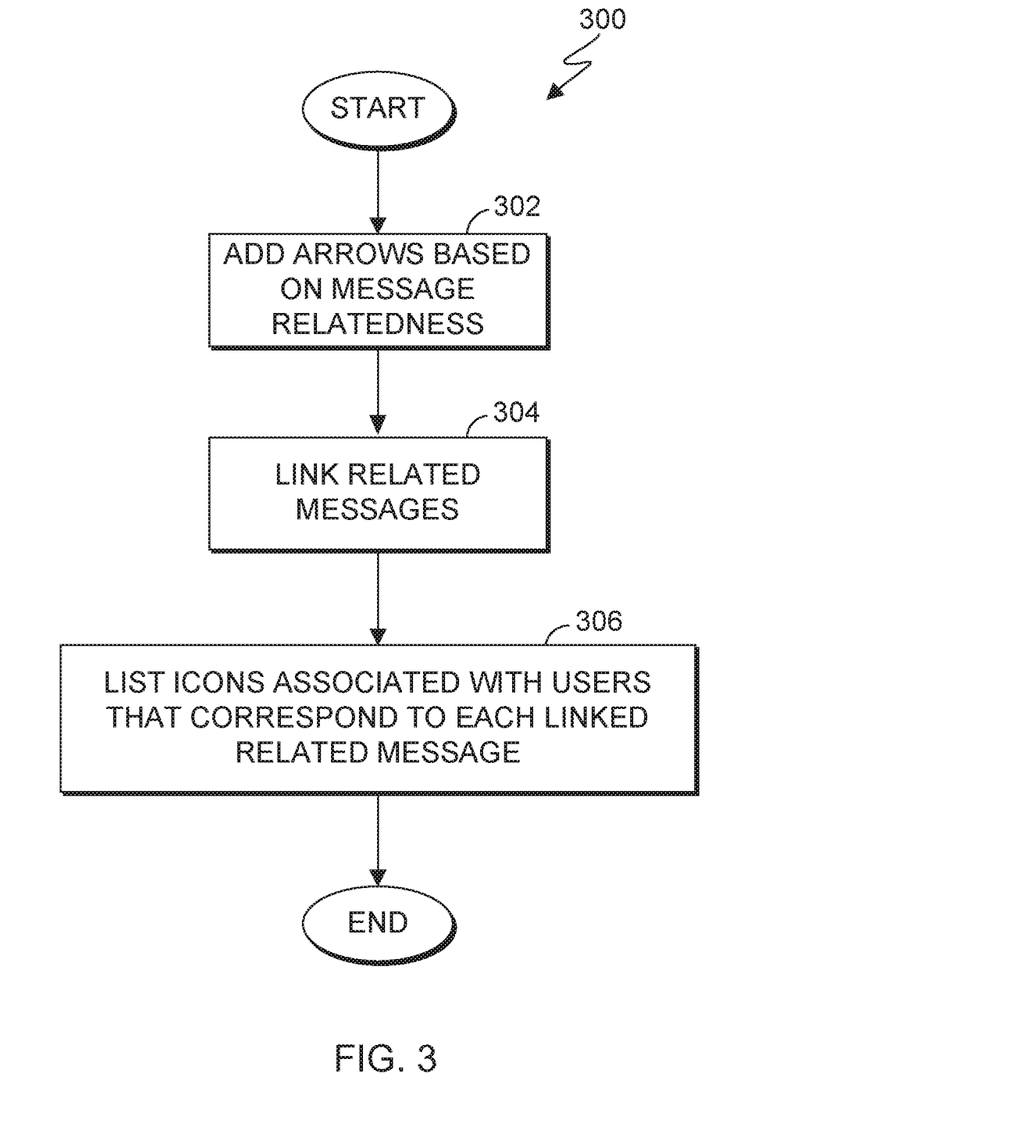
FIG. 3 is a flowchart illustrating operational steps for creating a graphical element, in accordance with an embodiment of the present invention.

FIG. 3 is a flowchart 300 illustrating operational steps for creating a graphical element, in accordance with an embodiment of the present invention. For example, the operational steps of flowchart 300 can be performed at step 204 of flowchart 200.

In step 302, message analysis program 104 adds arrows to messages of the user interface displaying messages. In this embodiment, message analysis program 104 adds arrows to messages based, at least in part on message relatedness (e.g., parent/child relationship). For example, message analysis program 104 can add arrows to the end of messages to denote relationships (e.g., parent/child relationship). In this embodiment, a "down arrow" indicates a parent message. Conversely, an "up arrow" denotes a child message. In other embodiments, message analysis program 104 can use any combination of symbols to denote message relatedness. An example output of step 302 is discussed in greater detail with regard to FIGS. 4A and 4B.

Where one parent message has more than one child messages that respond to the parent message, message analysis program 104 can add a number following the "down arrow" to indicate the number of child messages that have responded to the parent message. For example, two subsequent child messages can respond to a parent message. Message analysis program 104 can then add a down arrow to the parent message and a number two in front of the arrow to indicate that two separate child messages have responded.

Conversely, where one child message responds to multiple parent messages, message analysis program 104 can add a number following the "up arrow" to show that the child message responds to more than one parent message. For example, in a group message between four users, alpha, beta, gamma, and delta, users alpha, beta, and gamma may generate messages $M_{1-3}$, respectively. User delta generates two messages $M_4$ and $M_5$ and has indicated that message $M_4$ responds to message $M_1$ and $M_2$, while message $M_5$ responds to message $M_3$. Message analysis program 104 can then add down arrows at the end of messages $M_{1-3}$. Message analysis program 104 also adds up arrows to the ends of messages $M_4$ and $M_5$. Message analysis program 104 can then add a number two in front of the up arrow to denote that message $M_4$ responds to multiple parent messages (e.g., messages $M_1$ and $M_2$).

In step 304, message analysis program 104 links related messages. In this embodiment, message analysis program 104 links related messages by associating parent and child messages so that responsive to selecting one, retrieves the other. For example, a group message can have three messages $M_{1-3}$. Message $M_1$ is an original, parent message. Message $M_2$ is an unrelated parent message. Message $M_3$ is a child message that responds to message $M_1$. Message analysis program 104 can link messages $M_1$ and $M_3$ so that by selecting message $M_1$, the user interface scrolls over unrelated messages (e.g., message $M_2$) and displays message $M_3$.

In step 306, message analysis program 104 lists icons associated with users that corresponds to each linked related message. In this embodiment, message analysis program 104 can list icons at the end of each linked message (i.e., next to the added arrow) to denote users associated with linked messages. For example, a group message can have three messages $M_{1-3}$. Message $M_1$ is an original, parent message associated with icon A of user alpha. Message $M_2$ is an unrelated parent message associated with icon B of user beta. Message $M_3$ is a child message that responds to message $M_1$ and is associated with icon C of user gamma. Message analysis program 104 displays miniature icons A and C at the end of message $M_1$. An example output of step 306 is discussed in greater detail with regard to FIGS. 4C and 5B.

In this embodiment, message analysis program 104 can enlarge the miniature icons responsive to selecting a linked message. Continuing the above example, a user may select linked message $M_1$. Responsive to selecting linked message $M_1$, message analysis program 104 can enlarge icons associated with users alpha and gamma. In this embodiment, a message may be selected via a touch screen and pressing an area of the screen that corresponds to the message and holding the point for a user-defined number of seconds.

In other embodiments, message analysis program 104 can hide the miniature icons and display them responsive to a user selecting an option to display the miniature icons. For example, in a touch screen display, an option may be selecting an area of a screen display. Responsive to a user selecting an area of the screen display, message analysis program 104 can display the miniature icons.

Optionally, message analysis program 104 can scroll to the response of a parent message responsive to a user selecting the miniature icon. Continuing the above example, responsive to selecting linked message $M_1$, message analysis program 104 can enlarge icons associated with users alpha and gamma. Responsive to a user selecting the icon associated with user alpha, message analysis program 104 can scroll through the group message (i.e., to skip over message $M_2$) to display the response of user alpha (e.g., to display message $M_3$).

Accordingly, by performing the operational steps of FIG. 3, message analysis program 104 creates a graphical element that users can interact with to avoid potential confusion in a group message. In this embodiment, message analysis program 104 creates a graphical element to users by: identifying relationships between messages based, at least in part on the content of the message; adding up and down arrows to differentiate between parent and child messages; and listing icons associated with users to enable a user to identify which users have responded to messages.

Figure 4A:
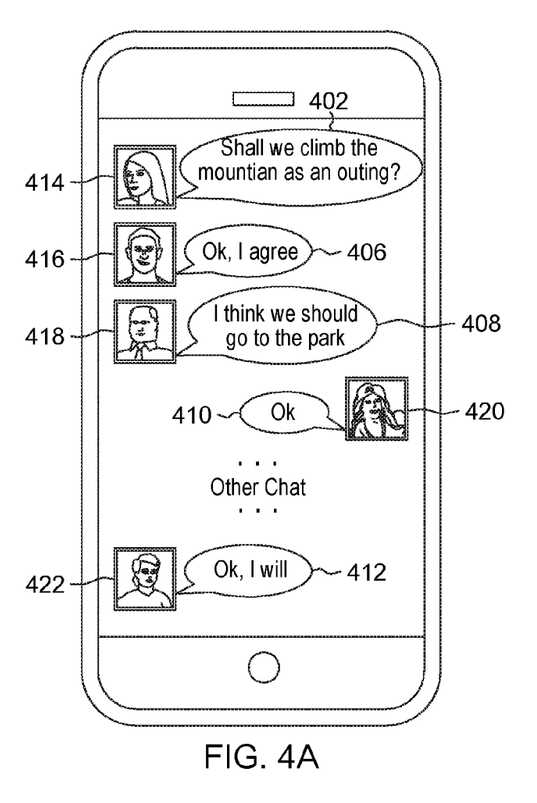
FIGS. 4A-4C are example screenshots of a user interface displaying messages before and after creating a graphical element, in accordance with an embodiment of the present invention.
Figure 4B:
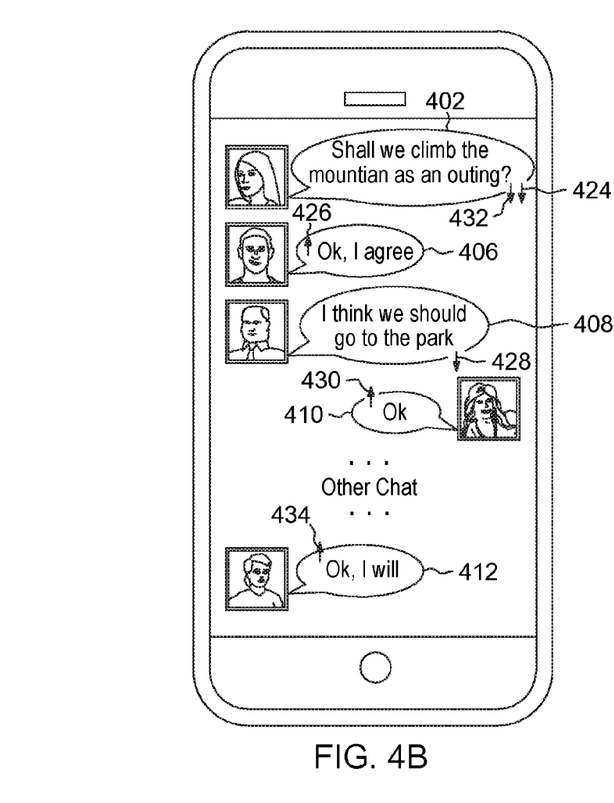
Figure 4C:
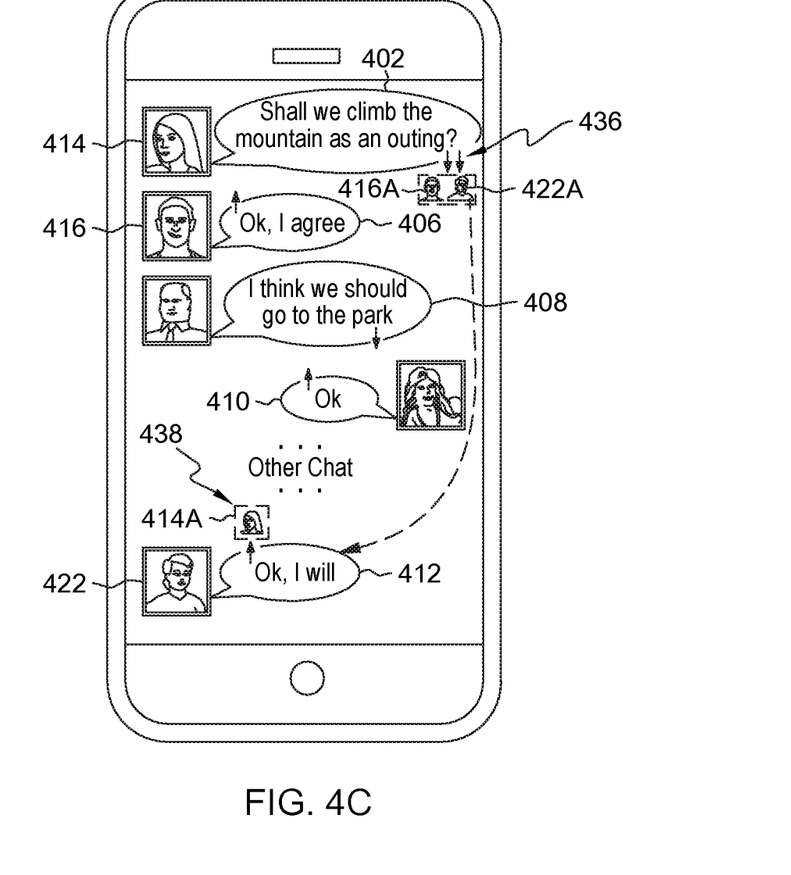

FIGS. 4A-4C are example screenshots of a user interface displaying messages before and after creating a graphical element, in accordance with an embodiment of the present invention. In this example, a group message comprising five messages between five users (e.g., alpha, beta, gamma, delta, epsilon) is described. Each user is associated with a unique icon that identifies and distinguishes one user from the next. Each message sent by users is displayed after its respective user's icon. In this example, five users are planning a group activity.

FIG. 4A is an example screenshot of a group message before message analysis program 104 creates a graphical element for linked messages. In this example, icon 414 denotes user alpha, and message 402 denotes user alpha's message. Message 402 comprises text that asks the other users a question and suggests mountain climbing as the group activity. Icon 416 denotes user beta along with user beta's message 406. Message 406 is generated in response to message 402. The contents of message 406 indicate that user beta agrees with the suggestion contained in message 402.

Icon 418 denotes user gamma and message 408 denotes user gamma's message. The contents of message 408 respond to message 402 but do not agree with the proposal of message 402. Instead the contents of message 408 indicate that user gamma suggests going to the park as an alternative.

Icon 420 denotes user delta and message 410 denotes user delta's message. The contents of message 410 indicate that user delta is in agreement. However, the contents of message 410 do not specify to which message (e.g., message 402 or message 408) user delta is in agreement with, which can cause confusion among the users. Message analysis program 104 can create visual indications to eliminate this confusion as shown and described in FIGS. 4B and 4C.

FIGS. 4B and 4C are example screenshots of graphical elements that message analysis program 104 creates. For example, the screenshot of FIG. 4B may be generated at step 302 and 306 of flowchart 300.

In this example, message analysis program 104 has identified that: message 402 is a parent message; message 406 is a child message that was generated in response to message 402; message 408 responds to message 402 and is a parent message because the contents of message 408 do not answer the question posed in message 402; message 410 is a child message of message 408; and that message 412 is a child of message 402.

In FIG. 4B, message analysis program 104 creates a graphical element that depicts the relationships described above. Arrows 424 and 432 are added to message 402 to denote that message 402 is a parent message for more than one child message. Arrow 426 is added to message 406 to indicate that it is a child message. Similarly, arrow 428 is added to message 408 to denote a parent message while arrow 430 denotes message 410 as a child message. Arrow 434 is added to message 412 to show that message 412 is also a child message.

FIG. 4C is an example screenshot of miniature icons added to the linked messages which help illustrate which messages and users correspond to each other. For example, the screenshot of FIG. 4C may be generated at step 306 of flowchart 300.

In this example, a user has selected area 436 which is associated with message 402. Responsive to selecting area 436, icons 416A and 422A are displayed. In this example, icons 416A and 422A are miniature icons of 416 and 422, respectively. Thus, selecting message 402 by selecting area 436, allows a user to visually see the users who have responded to message 402 (e.g., icon 416 and 422 which correspond to users beta and epsilon). Conversely, selecting message 412 by touching area 438 displays icon 414A.

In this example, a user has selected icon 422A. Responsive to receiving a user selection of icon 422A, message analysis program 104 can display the child message that responds to message for 402 (e.g., message 412). In this embodiment, message analysis program 104 scrolls past other messages (e.g., messages 406, 408, and 410) not linked to the selected message (e.g., 402) which then allows a user to jump to message 412. In other embodiments, message analysis program 104 can display the linked messages in any manner known in the art.

Figure 5A:
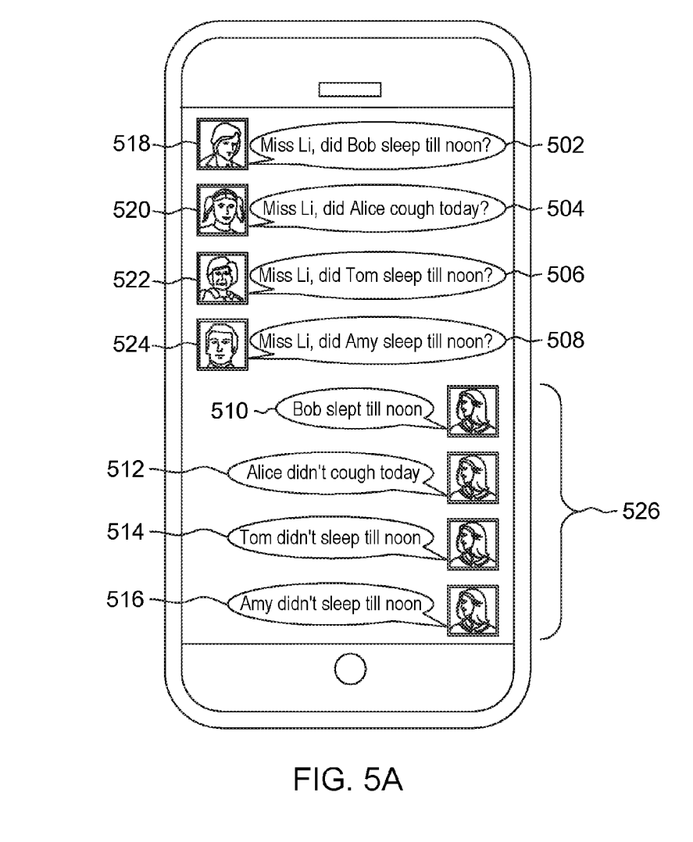
FIGS. 5A and 5B are example screenshots of a user interface displaying before and after graphical elements displaying linked messages, in accordance with an embodiment of the present invention.
Figure 5B:
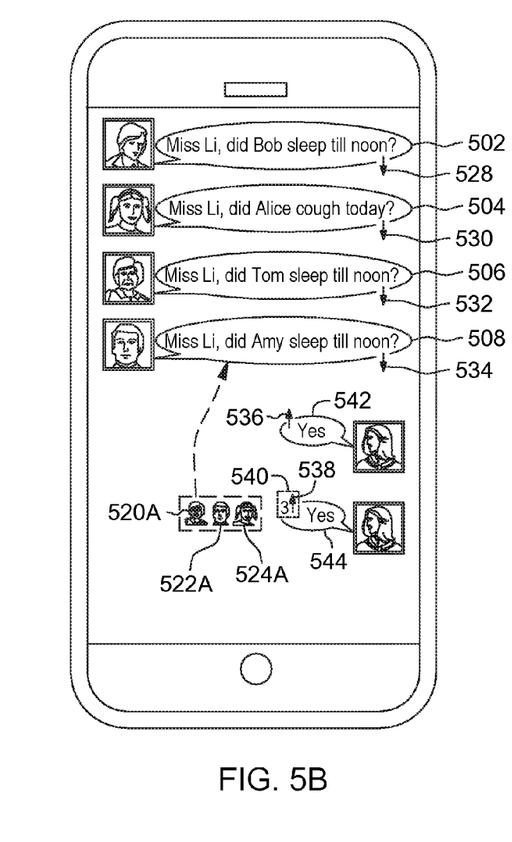

FIGS. 5A and 5B are example screenshots of a user interface displaying before and after visual indications displaying linked messages, in accordance with an embodiment of the present invention. For example, FIG. 5A is a screenshot before message analysis program 104 has created a graphical element.

In this example, five users (alpha, beta, gamma, delta, and epsilon) have a group message. User epsilon is a teacher and is identified by icon 526. Users alpha, beta, gamma, and delta are caretakers of students taught by epsilon and are identified by icons 518, 520, 522, and 524, respectively. Each caretaker is asking user epsilon a question about the caretaker's respective student, generating messages 502, 504, 506, and 508, respectively.

In this example, user epsilon generates messages 510, 512, 514, and 516 to respond to messages 502, 504, 506, and 508, respectively. Instead of responding with simple "yes" and "no" answers, user epsilon has to include enough detail in user epsilon's response to indicate which message user epsilon is responding to.

FIG. 5B is an example graphical element created by message analysis program 104. In this example, message analysis program 104 has identified that two messages, messages 542 and 544 are child messages. Specifically, message analysis program 104 has identified that message 542 responds to message 502 and that message 544 responds to messages 504, 506, and 508.

Message analysis program 104 has added arrows 528, 530, 532, and 534 that indicate messages 502, 504, 506, and 508 are all parent messages. Message analysis program 104 has also added arrows 536 and 538 to denote that messages 542 and 544 are child messages, respectively.

In instances where a child message responds to more than one message (e.g., message 544 responds to messages 504, 506, and 508), message analysis program 104 can add the number of messages that child message responds to. In this example, arrow 538 indicates that message 544 responds to three different parent messages. In this example, a user has selected area 540 which displays icons 520A, 522A, and 524A which indicate the icons belonging to the users whose message has been responded to.

Figure 6:
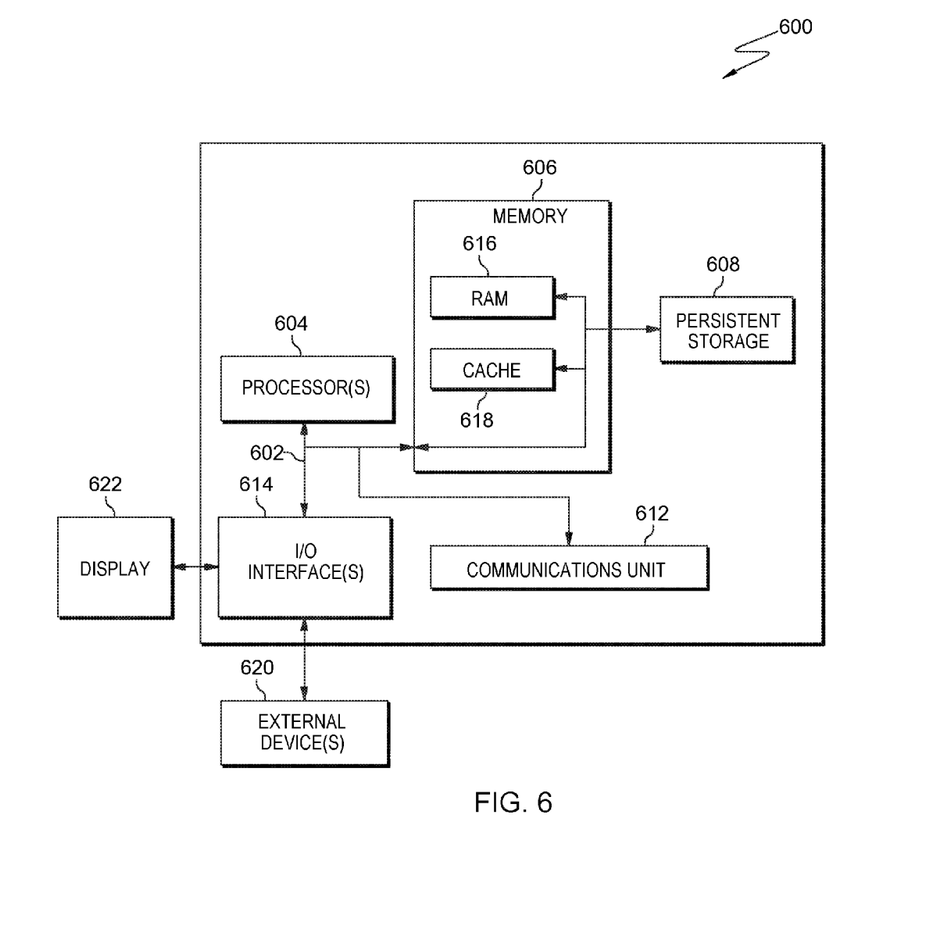
FIG. 6 is a block diagram of internal and external components of the computer systems of FIG. 1, in accordance with an embodiment of the present invention.

FIG. 6 is a block diagram of internal and external components of a computer system 600, which is representative of the computer systems of FIG. 1, in accordance with an embodiment of the present invention. It should be appreciated that FIG. 6 provides only an illustration of one implementation and does not imply any limitations with regard to the environments in which different embodiments may be implemented. In general, the components illustrated in FIG. 6 are representative of any electronic device capable of executing machine-readable program instructions. Examples of computer systems, environments, and/or configurations that may be represented by the components illustrated in FIG. 6 include, but are not limited to, personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 600 includes communications fabric 602, which provides for communications between one or more processors 604, memory 606, persistent storage 608, communications unit 612, and one or more input/output (I/O) interfaces 614. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer-readable storage media. In this embodiment, memory 606 includes random access memory (RAM) 616 and cache memory 618. In general, memory 606 can include any suitable volatile or non-volatile computer-readable storage media. Software is stored in persistent storage 608 for execution and/or access by one or more of the respective processors 604 via one or more memories of memory 606.

Persistent storage 608 may include, for example, a plurality of magnetic hard disk drives. Alternatively, or in addition to magnetic hard disk drives, persistent storage 608 can include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 608 can also be removable. For example, a removable hard drive can be used for persistent storage 608. Other examples include optical and magnetic disks, thumb drives, and smart cards that are inserted into a drive for transfer onto another computer-readable storage medium that is also part of persistent storage 608.

Communications unit 612 provides for communications with other computer systems or devices via a network (e.g., network 106). In this exemplary embodiment, communications unit 612 includes network adapters or interfaces such as a TCP/IP adapter cards, wireless Wi-Fi interface cards, or 3G or 4G wireless interface cards or other wired or wireless communication links. The network can comprise, for example, copper wires, optical fibers, wireless transmission, routers, firewalls, switches, gateway computers and/or edge servers. Software and data used to practice embodiments of the present invention can be downloaded to computer system 102 through communications unit 612 (e.g., via the Internet, a local area network or other wide area network). From communications unit 612, the software and data can be loaded onto persistent storage 608.

One or more I/O interfaces 614 allow for input and output of data with other devices that may be connected to computer system 600. For example, I/O interface 614 can provide a connection to one or more external devices 620 such as a keyboard, computer mouse, touch screen, virtual keyboard, touch pad, pointing device, or other human interface devices. External devices 620 can also include portable computer-readable storage media such as, for example, thumb drives, portable optical or magnetic disks, and memory cards. I/O interface 614 also connects to display 622.

Display 622 provides a mechanism to display data to a user and can be, for example, a computer monitor. Display 622 can also be an incorporated display and may function as a touch screen, such as a built-in display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer program product comprising:
   one or more non-transitory computer readable storage media and program instructions stored on the one or more non-transitory computer readable storage media, the program instructions comprising:
   program instructions to identify at least a first message and a second message that responds to the first message, wherein the first message corresponds to a first user and the second message corresponds to a second user;
   program instructions to display in a location of a user interface that corresponds to a location displaying the first message, a first graphical element and a first symbol, wherein the first graphical element is an icon associated with the second user, and wherein the first symbol is a down arrow indicating that the second message is a message that responds to the first message;
   program instructions to display in a location of the user interface that corresponds to a location displaying the second message, a second graphical element and a second symbol, wherein the second graphical element is an icon associated with the first user, and wherein the second symbol is an up arrow indicating that the first message is a message that the second message responds to;

program instructions to, responsive to receiving a user interaction with the first graphical element, display in the user interface, a visual indication that identifies the second message by highlighting the second message in the user interface;

program instructions to, responsive to receiving a user interaction with the second graphical element, display a visual indication that identifies the first message by highlighting the first message in the user interface;

program instructions to identify a third message that responds to the first and the second message, wherein the third message corresponds to a third user;

program instructions to generate a display for the first, second, and third message, wherein the display includes a third graphical element associated with the third user, and a third symbol that aggregates graphical elements associated with the first and second message that the third message responds to;

program instructions to, responsive to a user interaction with the third symbol, display one or more graphical elements associated with the first and second message that correspond to the first and the second user, respectively; and program instructions to, responsive to a user selecting a graphical element that corresponds to the first user, display the first message associated with the first user.

\* \* \* \* \*